March 19, 1957  R. J. BARTLETT  2,785,786
CONVEYING APPARATUS
Filed April 25, 1955  3 Sheets-Sheet 1
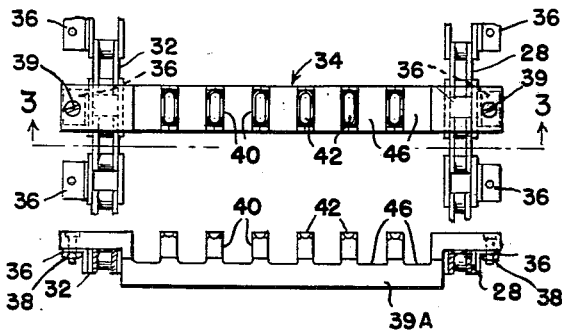
FIG. 2.
FIG. 3.
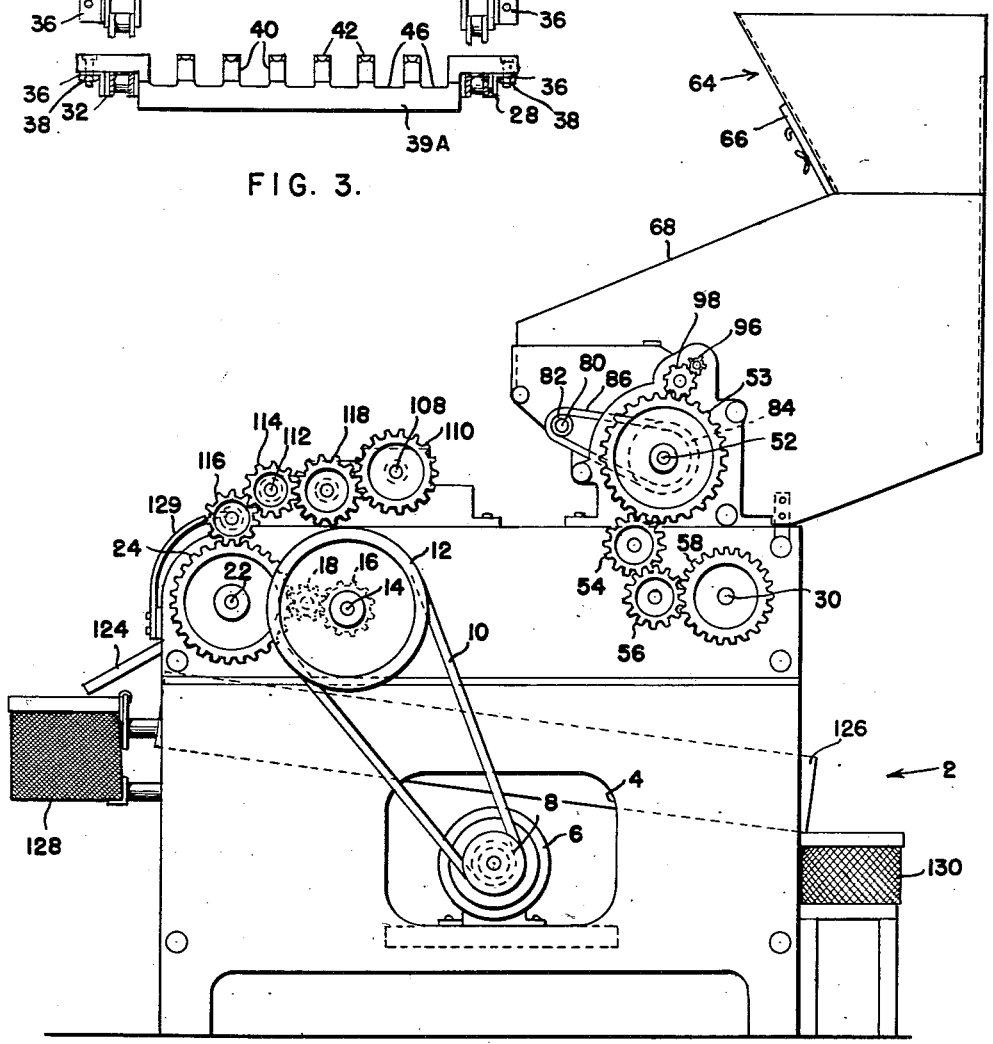
FIG. 1.
INVENTOR.
RICHARD J. BARTLETT
BY
ATTORNEYS March 19, 1957 R. J. BARTLETT 2,785,786
CONVEYING APPARATUS
Filed April 25, 1955 3 Sheets-Sheet 2

INVENTOR.
RICHARD J. BARTLETT
BY
ATTORNEYS

March 19, 1957 R. J. BARTLETT 2,785,786
CONVEYING APPARATUS
Filed April 25, 1955 3 Sheets-Sheet 3

INVENTOR.
RICHARD J. BARTLETT
BY

ATTORNEYS

United States Patent Office 2,785,786
Patented Mar. 19, 1957

2,785,786

CONVEYING APPARATUS

Richard J. Bartlett, Lansdale, Pa., assignor to Smith, Kline & French Laboratories, Philadelphia, Pa., a corporation of Pennsylvania Application April 25, 1955, Serial No. 503,593

6 Claims. (Cl. 198—33)

This invention relates to conveying apparatus and, more particularly, relates to such apparatus suitable for use with capsules, tablets and other pharmaceutical forms.

The conveying apparatus in accordance with this invention is particularly useful where some work is to be performed on the article being conveyed. For purposes of illustration, the apparatus in accordance with this invention will be described in conjunction with printing mechanism. Thus, for example, it is frequently desired to print an indicia on an article being conveyed. In the pharmaceutical field, for example, it is frequently desired to print a trademark on a capsule or tablet. Where a printing operation is being carried out, it is necessary that the article to be printed be carefully aligned on the conveyor in a predetermined position. Heretofore, if an article was mispositioned, it was, nevertheless, carried along by the conveying apparatus and discharged with the properly positioned articles, despite the fact it had not been properly printed.

In accordance with this invention, there is provided means for separating out articles improperly positioned on the conveying apparatus so that they can be collected separately from the articles which have been properly positioned and hence properly printed or otherwise worked upon.

Other objects of this invention will become apparent on reading the description in conjunction with the drawings in which:

Figure 1 is a side elevation of an apparatus in accordance with this invention shown in conjunction with printing means;

Figure 2 is a plan view of a conveyor bar in accordance with this invention attached to conveyor chains;

Figure 3 is a vertical section taken on the plane indicated by the line 3—3 in Figure 2;

Figure 4:
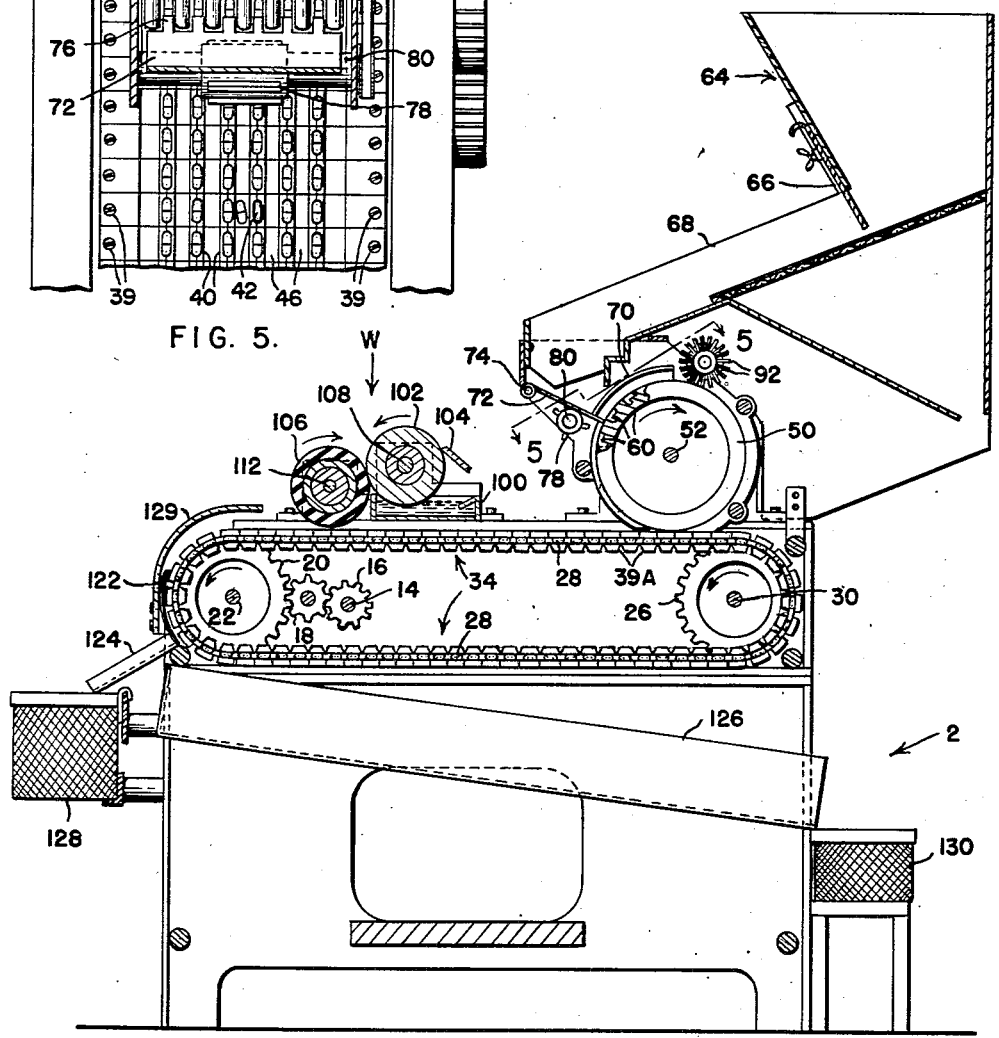
Figure 4 is a vertical section through the center of the apparatus of Figure 1.

The conveying apparatus 2 in accordance with this invention is provided with an electric motor 4 having a reduction gear box 6 which drives a pulley 8. A V belt 10 connects pulley 8 to a pulley 12 which is mounted on a shaft 14. Shaft 14 also carries a gear 16 which drives a gear 18 which, in turn, drives a gear 20 secured to a shaft 22 (Figure 4). Shaft 22 carries a sprocket 24 which is connected to a sprocket 26 by a chain 28. Sprocket 26 is mounted on shaft 30. A second chain 32, running in a plane parallel to the plane in which chain 28 runs, is carried by a sprocket (not shown) on shaft 22 which is identical to sprocket 24 and a sprocket (not shown) on shaft 30 which is identical with sprocket 26. Carrier bars 34 are mounted on chains 28 and 32 by means of L-shaped brackets 36. Brackets 36 are secured to the chains by, for example, welding. Bolts 39 pass through carrier bars 34 and brackets 36 and are secured by nuts 38. Carrier bars 34 have tapered lower portions 39A.

Figure 5:
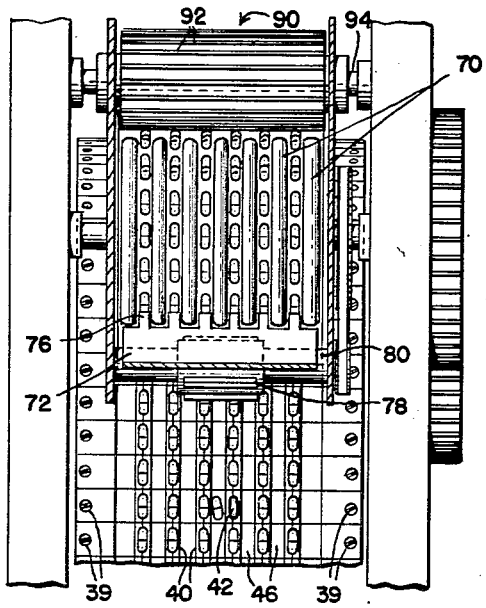
Figure 5 is a sectional view taken on the plane indicated by the line 5—5 in Figure 4.

Each carrier bar 34 has a plurality of pedestals 40, each of which is provided with a recessed portion 42 shaped to receive a capsule 44. The space between pedestals 40 forms a trough 46 for the reception of capsules which fail to be seated properly in recessed portions 42. As shown in Figure 5, a series of carrier bars 34 are adjacently secured to chains 28 and 32.

The carrier bars 34 can be hand loaded, if desired. Alternatively, as illustrated in Figures 1, 4 and 5, the carrier bars can be loaded by mechanical means. As shown in Figure 4 a capsule loading wheel 50 is mounted on a shaft 52. Shaft 52 carries a gear 53 (Figure 1) which is driven by a train of gears 54, 56 and 58, the latter gear being secured to shaft 30.

Figure 6:
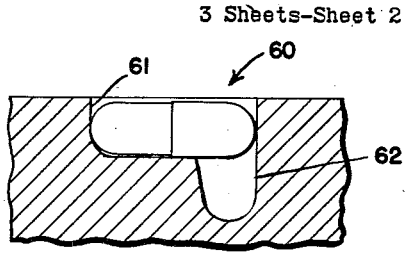
Figure 6 is a section through the capsule loading wheel showing an enlarged view of one of the pockets in the wheel for holding the capsule.

Capsule loading wheel 50 has peripheral rows of capsule receiving pockets 60. As best shown in Figure 6, the pockets 60 have an outer portion 61 in which the capsule is designed to fit snugly and an inwardly extending portion 62 into which one end of a capsule can pivot to facilitate its release. Pockets 60 register with recess portions 42 of pedestals 40 when the capsule is substantially horizontal which permits the capsule to be discharged from pocket 60 into the corresponding recess portion 42 of pedestal 40.

As best seen in Figures 4 and 5, the capsule loading wheel 50 is loaded with capsules supplied by hopper 64 which has an adjustable valve 66 regulating the flow of capsules to slide 68. The capsules leaving slide 68 enter the spaces between partitions 70 which are spaced apart a distance slightly greater than the width of a capsule and provide openings aligned over capsule receiving pockets 60. An agitator plate 72 which is pivoted at 74 and has fingers 76 which pass between partitions 70 is agitated by an eccentric member 78 secured to shaft 80. Shaft 80 carries a pulley 82 (Figure 1) which is connected to a pulley 84 on shaft 52 by a V belt 86.

A brush 90, having rubber blades 92 which engage the surface of capsule loading wheel 50, acts to brush back capsules which are not fully seated in the capsule receiving pocket 60 (see Figure 5). Brush 90 is secured to shaft 94 which carries a gear 96 (see Figure 1). Gear 96 is in mesh with a gear 98 which, in turn, is rotated by gear 53.

Each carrier bar 34, as it passes away from capsule loading wheel 50, will have recess portions 42 filled with properly aligned capsules 44 except in those cases where the capsule is not properly presented to the recess portion 42, in which event the capsule will fall over into a trough 46. Each carrier bar is then advanced to the work area indicated at "W" where the work is to be performed (Figure 4). As illustrated in the particular case at hand, the capsules are to be printed. The apparatus for printing the capsules is well known to the art and need not, therefore, be described in detail.

As shown, an ink reservoir 100 supplies a metal wheel 102 having indented printing with ink, the excess being wiped off by a blade 104. Drum 102 wipes against a rubber drum 106 and prints the ink on drum 106. The printing on drum 106 is in registry with the capsules properly mounted on pedestals 40 and thus the printing is transferred onto the capsules.

As shown in Figure 1, drum 102 is mounted on a shaft 108 which, in turn, carries a gear 110 and drum 106 is mounted on a shaft 112 which carries a gear 114. Gear 114 is driven by gear 116 which engages gear 24. In turn, gear 114 drives a gear 118 which drives gear 110.

When the carrier bars have passed the work area "W" which, as illustrated, may be involved in a printing operation, they are advanced towards and then around the arc defined by the sprockets at the discharge end of the conveying system.

Figure 7:
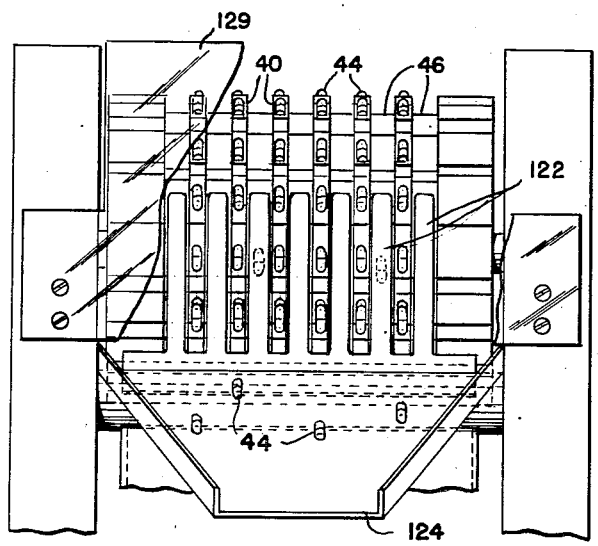
Figure 7 is a front elevation, partially broken away, of the apparatus of Figure 1.
Figure 8:
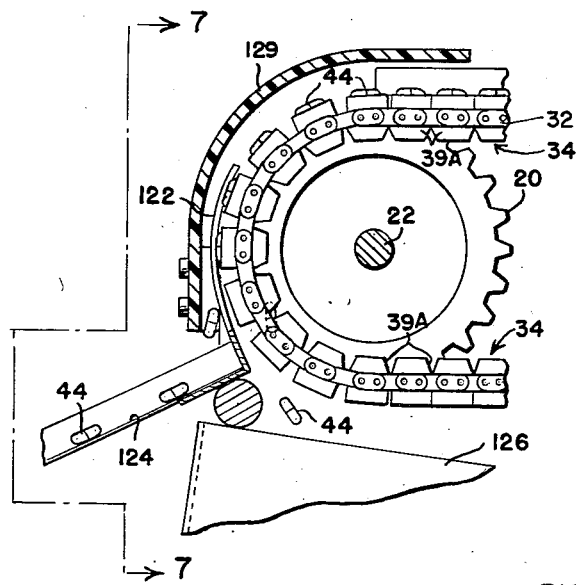
Figure 8 is a vertical section of the apparatus shown in Figure 7.

As best seen in Figures 7 and 8, a plurality of arcuate fingers 122 are secured to a discharge chute 124. The arcuate fingers 122 have a width approximately equal to the width of the trough sections 46 of the carrier bars 34 and are positioned so as to prevent the capsules in the trough 46 from being thrown forwardly and being discharged to chute 124. Thus fingers 122 insure that the capsules in the trough 46 will be carried downwardly into chute 126.

The capsules resting on the pedestals 40 fall forwardly between fingers 122 and are caught by discharge chute 124 which discharges into a container 128. A deflector 129 prevents the capsules on the pedestals from being discharged too far forwardly, thus helping to insure that these capsules are caught by chute 124. Chute 126 can be led rearwardly to be discharged into a container 130.

Thus it will be seen that the capsules which have been properly aligned on pedestals 40 and properly printed will be automatically collected in container 128 whereas the unprinted capsules will be collected in the separate container 130. It will also be appreciated that any capsules which are misaligned by the apparatus of the work area W will fall over into trough 46 and hence be discharged into the separate container 130.

It is not desired to be limited except as set forth in the following claims.

What is claimed is:

1. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, means at the discharge end of the apparatus between said pedestals to deflect articles carried in said troughs into a path to the rear of the discharge path of the articles on said pedestals.

2. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, finger means at the discharge end of the apparatus between said pedestals to deflect articles carried in said troughs into a path to the rear of the discharge path of the articles on said pedestals.

3. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, means at the discharge end of the apparatus between said pedestals to deflect articles carried in said troughs into a path to the rear of the discharge path of the articles on said pedestals and a chute adapted to convey the articles discharged from the pedestals and a chute adapted to convey the articles discharged from the troughs.

4. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, means to position articles on said pedestals, means at the discharge end of the apparatus between said pedestals to deflect articles carried in said troughs into a path to the rear of the discharge path of the articles on said pedestals.

5. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, means to position articles on said pedestals, finger means at the discharge end of the apparatus between said pedestals to deflect articles carried in said troughs into a path to the rear of the discharge path of the articles on said pedestals.

6. Conveying apparatus comprising a pair of sprocket mounted chains lying in substantially parallel planes, a plurality of carrier bars mounted on said chains, each carrier bar having a plurality of pedestals and troughs adjacent the pedestals, each pedestal being provided with a recessed portion adapted to receive an article to be conveyed, means to position articles on said pedestals, finger means at the discharge end of the apparatus between said pedestals to deflect articles carried in said troughs into a path to the rear of the discharge path of the articles on said pedestals, a chute adapted to convey the articles discharged from the pedestals and a chute adapted to convey the articles discharged from the troughs.

References Cited in the file of this patent

UNITED STATES PATENTS 2,702,112    Hait    Feb. 15, 1955

FOREIGN PATENTS 508,470    Germany    Oct. 2, 1930